United States Patent
Ninane et al.

(10) Patent No.: US 6,692,720 B1
(45) Date of Patent: Feb. 17, 2004

(54) METHOD FOR PRODUCING SODIUM CHLORIDE CRYSTALS

(75) Inventors: Leon Ninane, Dombasle-sur-Meurthe (FR); Cédric Humblot, Vincennes (FR); Pascal Gerard, Strepy-Bracquegnies (BE)

(73) Assignee: Solvay (Societe Anonyme), Brussels (BE)

(*) Notice: Subject to any disclaimer, the term of this patent is extended or adjusted under 35 U.S.C. 154(b) by 0 days.

(21) Appl. No.: 09/763,638

(22) PCT Filed: Aug. 10, 1999

(86) PCT No.: PCT/EP99/05825
§ 371 (c)(1),
(2), (4) Date: Aug. 27, 2001

(87) PCT Pub. No.: WO00/12433
PCT Pub. Date: Mar. 9, 2000

(30) Foreign Application Priority Data
Aug. 26, 1998 (FR) .......................................... 98 10751

(51) Int. Cl.$^7$ .............................................. C01D 3/16

(52) U.S. Cl. ................................. 423/499.4; 423/499.5; 423/499.1; 423/518

(58) Field of Search ........................ 423/499.4, 499.5, 423/499.1, 518; 23/302 T

(56) References Cited

U.S. PATENT DOCUMENTS

| | | | | | |
|---|---|---|---|---|---|
| 3,634,032 | A | * | 1/1972 | Segrove | 425/340 |
| 4,180,547 | A | * | 12/1979 | Chirico | 423/197 |
| 4,385,902 | A | * | 5/1983 | Haugrud | 23/293 R |
| 4,547,197 | A | * | 10/1985 | Winkler | 23/302 T |
| 5,300,123 | A | * | 4/1994 | Grott | 23/303 |

* cited by examiner

Primary Examiner—Ngoc-Yen Nguyen
(74) Attorney, Agent, or Firm—Larson & Taylor PLC

(57) ABSTRACT

Process for the production of sodium chloride crystals from a sodium chloride brine contaminated by potassium chloride and sulphate ions, according to which a calcium compound (32) is added to the brine (48) to crystallize glauberite (35), which is isolated, the resulting aqueous solution (36) is subjected to evaporation to crystallize sodium chloride (40), which is collected, and the aqueous mother liquor (41) from the crystallization of the sodium chloride is subjected to cooling (42) to crystallize glaserite (45).

10 Claims, 2 Drawing Sheets

METHOD FOR PRODUCING SODIUM CHLORIDE CRYSTALS

The present invention relates to a process for the production of sodium chloride crystals.

A widely used technique for producing solid sodium chloride consists in crystallizing it by evaporation of a sodium chloride brine. The sodium chloride brine used in this technique can be, for example, seawater. In an alternative form, it can be obtained by dissolution of rock salt in water. The brines used in this technique for the manufacture of sodium chloride are usually contaminated by undesirable compounds which risk contaminating the sodium chloride. This is in particular the case with potassium chloride, sodium carbonate and sodium sulphate which, if they are not removed from the brine before evaporation of the latter, could easily be encountered in association with the sodium chloride crystals. The removal of these undesirable compounds moreover presents the problem of their discharge and of their storage (generally in public landfill sites) under conditions suited to preventing them from polluting the environment.

A process for the manufacture of sodium chloride crystals starting from a sodium chloride brine contaminated by potassium chloride and sulphate ions is known (U.S. Pat. No. 4,547,197). According to this known process, calcium hydroxide is added to the brine, to precipitate the sulphate ions in the form of calcium sulphate, and then sodium carbonate is added, to precipitate the calcium ions in the form of calcium carbonate. The aqueous solution collected after separation of the precipitates is subjected to evaporation at a temperature of approximately 120° C. to crystallize sodium chloride, which is collected, and the aqueous mother liquor from the crystallization is cooled to approximately 45° C. (preferably by subjecting it to a reduction in pressure) to crystallize simultaneously sodium chloride, potassium chloride and sodium sulphate. In this known process, the coprecipitation of the three salts (sodium chloride, potassium chloride and sodium sulphate) causes difficulties in the discharge of the latter. A solution suggested in the document U.S. Pat. No. 4,547,197 consists in dispersing the mixture of the three salts in cold water, so as to selectively dissolve the sodium chloride and the potassium chloride, while the sodium sulphate recrystallizes in the form of Glauber's salt.

The abovementioned known process exhibits a disadvantage of great complexity, imposed by the need to dispose of the mixture of the three salts (sodium chloride, potassium chloride and sodium sulphate) without harming the environment. This known process exhibits the additional disadvantage that it consumes a large amount of calcium compound (calcium hydroxide) in extracting the sulphate ions from the brine.

The invention is aimed at overcoming the disadvantages of the known process described above by providing a process for the manufacture of sodium chloride crystals from a brine contaminated by potassium chloride and sulphate ions which makes possible a substantial reduction in the consumption of calcium compound in extracting the sulphate ions from the brine and which, moreover, simplifies thee discharge and the storage of the residual solid materials from the purification.

The invention consequently relates to a process for the production of sodium chloride crystals from a sodium chloride brine contaminated by potassium chloride and sulphate ions, according to which, in a first stage, a calcium compound is added to the brine to precipitate calcium sulphate, which is isolated, and an aqueous solution is collected, in a second stage, the aqueous solution from the first stage is subjected to evaporation, to crystallize sodium chloride, and sodium chloride crystals and an aqueous mother liquor are collected separately, and, in a third stage, the aqueous mother liquor from the second stage is subjected to cooling in order to crystallize at least a portion of the potassium chloride; according to the invention, the amount of calcium compound in the first stage and the cooling in the third stage are adjusted so that the sulphate ions precipitate in the form of glauberite in the first stage and of glaserite in the third stage.

In the process according to the invention, the sodium chloride brine is, by definition, an aqueous sodium chloride solution. It is invariably an aqueous solution which is saturated or unsaturated with sodium chloride. Its content by weight of sodium chloride is advantageously greater than 5%, usually at least equal to 10%. Brines comprising at least 20% by weight of sodium chloride are especially recommended. Brines which are substantially saturated at ambient temperature are preferred.

The sodium chloride brine employed in the process according to the invention is contaminated by impurities. These impurities comprise potassium chloride and sulphate ions. The sulphate ions are, for example, present in the form of dissolved sodium sulphate. The impurities are normally present in brine in an amount of less than the sodium chloride content.

In the first stage of the process according to the invention, the role of the calcium compound is to react with the sulphate ions to form calcium sulphate, which crystallizes. The calcium compound must consequently be chosen from those which are capable of reacting with sulphate ions, in particular with alkali metal sulphates (in particular sodium sulphate), to form calcium sulphate. The calcium compound employed in the first stage is advantageously a water-soluble compound. Calcium chloride is preferred.

On conclusion of the first stage, the calcium sulphate crystals are isolated from the brine. The means employed for this purpose is not critical. It advantageously comprises a filtration or a sedimentation followed by a separation.

In the second stage of the process according to the invention, the aqueous solution collected after separation of the crystals from the first stage is subjected to evaporation in order to crystallize sodium chloride. The parameters of the evaporation (in particular temperature, pressure and the degree of evaporation) are chosen so as to avoid simultaneous crystallization of undesirable compounds, such as potassium chloride or sodium sulphate. The optimum values of these parameters will depend on the concentration of the brine, on its contents of potassium chloride and of sulphate ions and, if appropriate, on the other impurities present. They can be easily determined by routine work, from liquid-solid equilibrium diagrams, in particular the Na—K—Cl—SO$_4$—H$_2$O diagram, accessible from the information in the literature.

On conclusion of the second stage, the sodium chloride crystals are separated from the aqueous mother liquor. The said separation can be carried out by any appropriate means, for example by filtration, by centrifuging or by sedimentation followed by separation.

In the third stage of the process according to the invention, the aqueous mother liquor from the second stage is subjected to controlled cooling in order to render insoluble and to crystallize the potassium chloride.

In accordance with the invention, the calcium compound is employed in the first stage in an amount which is in deficiency with respect to that which is necessary to convert all the sulphate ions to calcium sulphate. More specifically, the amount of calcium compound employed in the first stage is adjusted according to the potassium content of the brine, so that a fraction of the sulphate ions of the brine precipitates in the form of glauberite (mixed calcium sulphate and sodium sulphate compound of general formula $CaSO_4.Na_2SO_4$) in the first stage and so that the balance of the sulphate ions precipitates with all the potassium ions in the form of glaserite (mixed potassium sulphate and sodium sulphate compound of general formula $Na_2SO_4.3K_2SO_4$) in the third stage. The removal of the sulphate ions and potassium ions by successive crystallizations of glauberite and glaserite is based on a sulphate content in the brine which is greater than that necessary to precipitate all the potassium ions in the form of glaserite. In practice, the brine should consequently comprise a molar amount of sulphate ions of greater than 1.5 times its molar content of potassium ions. The parameters of the process in the first stage (the temperature and the amount of calcium compound employed), in the second stage (the temperature, the pressure and the degree of evaporation) and in the third stage (the temperature and the pressure) should be determined in each specific case according to the concentration of the brine and according to its respective contents of potassium chloride and of sulphate ions. The optimum values of these parameters can be easily determined by calculation and from the liquid-solid equilibrium diagrams.

In practice, good results are obtained when the evaporation, in the second stage, is carried out at a temperature of greater than 75° C. and not exceeding 200° C. (temperatures of 80 to 120° C. being preferred). The pressure should be adjusted to the temperature selected and can be less than standard atmospheric pressure in the case of low temperatures or greater than the latter in the case of high temperatures. The cooling in the third stage is advantageously carried out at a temperature of less than 80° C., preferably of 10 to 70° C., temperatures in the region of ambient temperature (for example from 15 to 30° C.) being recommended.

It may happen that the aqueous solution collected from the first stage comprises dissolved calcium ions. To this end, according to a specific embodiment of the process according to the invention, the aqueous solution collected from the first stage has sodium carbonate added to it before carrying out the evaporation in the second stage. In this embodiment of the process according to the invention, the role of the sodium carbonate is to react with the residual calcium ions to crystallize calcium carbonate, which is removed by any appropriate means. The amount of sodium carbonate employed in this embodiment of the invention can be easily determined from the residual amount of calcium ions in the aqueous solution.

In addition to the potassium chloride and sulphate ions, the sodium chloride brine subjected to the process according to the invention can optionally comprise other dissolved impurities, in particular sodium carbonate. To this end, according to another embodiment of the process according to the invention, the brine is treated, upstream of the first stage, by any appropriate means for removing the sodium carbonate which it comprises. To this end, in a first alternative implementation of this embodiment of the process, the brine is treated, upstream of the first stage, with hydrochloric acid in order to decompose the sodium carbonate and to form sodium chloride. The carbon dioxide generated by the reaction is discharged from the brine by any appropriate degassing means. In a second alternative implementation, the brine is treated, upstream of the first stage, with carbon dioxide in order to crystallize sodium bicarbonate, which is collected.

The process according to the invention applies well to sodium chloride brines which comprise, per kg of dry matter, from 550 to 800 g of sodium chloride, from 50 to 350 g of sodium sulphate and from 5 to 100 g of potassium chloride, and optionally from 50 to 250 g of sodium carbonate. It finds an application in the treatment of seawater or sodium chloride brines obtained by dissolution of rock salt. The invention is especially suited to waste brines from the purification treatments, by means of basic sodium compounds, such as sodium hydroxide or sodium bicarbonate, of flue gases contaminated by hydrogen chloride. The invention is especially suited to the treatment of the brines produced by dispersing, in water, the residual material which is obtained after purification, by means of a basic reactant selected from sodium carbonate, sodium bicarbonate and sodium sesquicarbonate, of a flue gas originating from the incineration of waste comprising chlorinated compounds (in particular waste of domestic or hospital origin or some types of industrial waste) In this specific application of the process according to the invention, the brine is preferably subjected to a preliminary treatment for purification from heavy metals, for example by applying the technique disclosed in the document EP-B-603 218 [Solvay (Société Anonyme)].

Distinctive features and details of the invention will emerge from the following description of the appended drawings.

In these figures, identical reference notations denote identical components.

Figure 1:
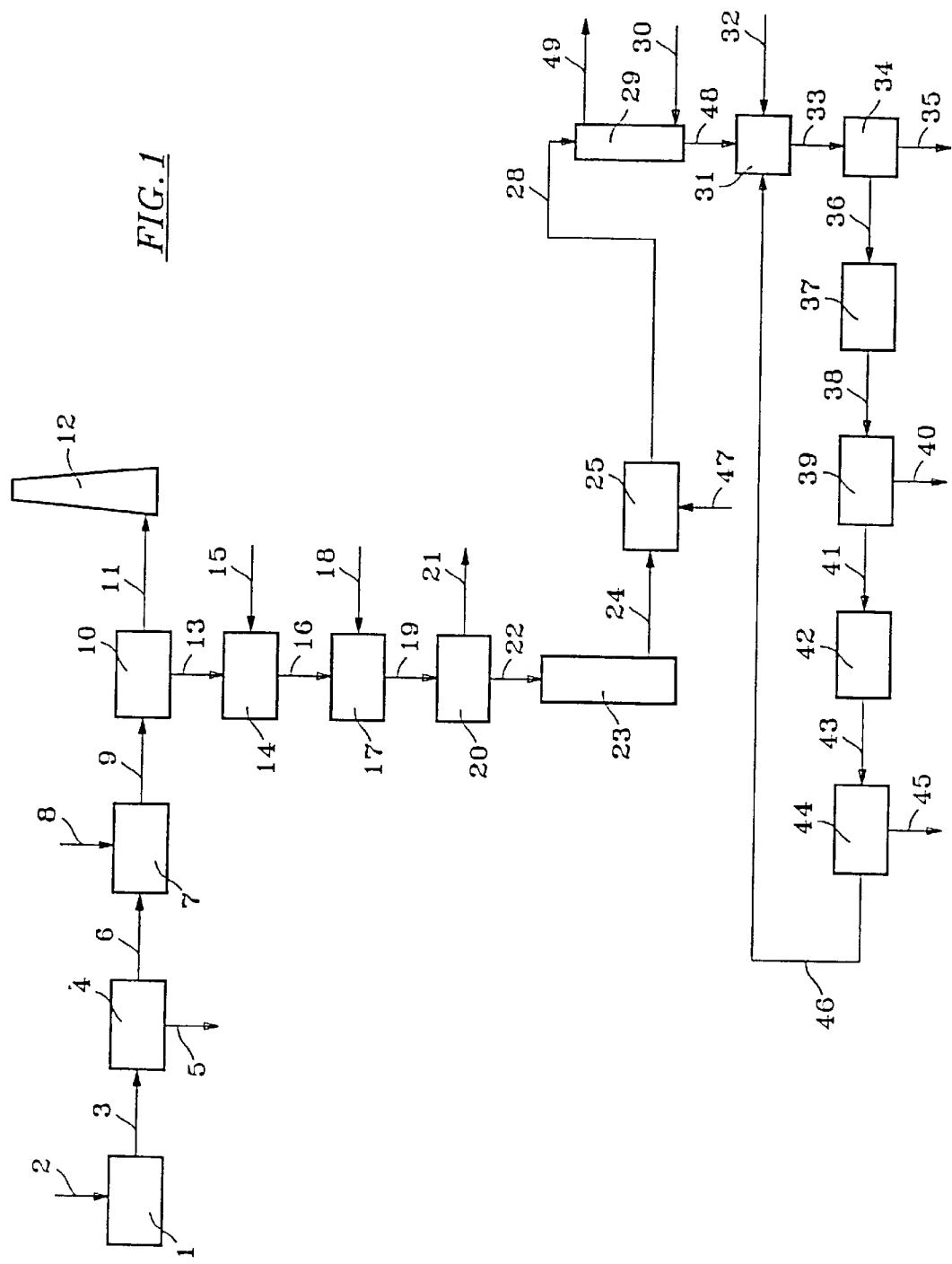
FIG. 1 represents the scheme of a specific embodiment of the process according to the invention.

In the embodiment in FIG. 1, the process according to the invention is applied to a sodium chloride brine obtained from a residual material from the purification of a flue gas generated by the incineration of waste comprising organic and inorganic chlorinated compounds.

It is known that domestic waste, hospital waste and some types of waste of industrial origin comprise organic and inorganic chlorinated compounds, the incineration of which gives rise to the emission of flue gases contaminated by hydrogen chloride.

The plant in FIG. 1 comprises a furnace 1 which is fed with domestic or hospital waste 2. The flue gas 3 emitted by the furnace 1 is contaminated by hydrogen chloride, volatile heavy metals and sulphur dioxide. It is furthermore laden with ash. It is first treated in a deduster 4 (for example a cyclone or an electrostatic filter) in order to separate the ash 5 therefrom. The dedusted flue gas 6 collected from the deduster 4 is introduced into the reaction chamber 7 where sodium bicarbonate 8 is added to it in the form of a powder. The sodium bicarbonate is introduced into the flue gas in an amount sufficient to decompose all the hydrogen chloride and sulphur dioxide in the flue gas and to form sodium chloride and sodium sulphate. The flue gas 9 collected from the reaction chamber 8 is treated on a filter 10 to dedust it and the thus dedusted flue gas 11 is discharged at the chimney 12. The filter 10 preferably comprises a filter with a filter cloth (for example a sleeve filter).

The dust 13 retained in the filter 10 comprises sodium chloride, sodium sulphate, potassium chloride, heavy metals and sodium carbonate originating from the excess sodium bicarbonate employed. It is conveyed to a dispersion chamber 14 where it is dispersed in water 15, so as to dissolve the sodium chloride and the other water-soluble compounds in the dust. Use is advantageously made of water which has been used to wash the ash 5. The aqueous medium 16 collected from the dissolution chamber 14 comprises an aqueous sodium chloride solution contaminated by dissolved impurities which comprise in particular heavy metals, potassium chloride, sodium sulphate and sodium carbonate. The aqueous medium 16 is conveyed to a reaction chamber 17 where a sufficient amount of sodium hydroxide 18 is added to it to precipitate the heavy metals in the form of hydroxides. The aqueous suspension 19 collected from the reaction chamber 17 is conveyed to a filter 20 where a precipitate 21, comprising heavy metal hydroxides and, if appropriate, various other residual insoluble compounds, is separated. The filtrate 22 is conveyed to a column 23 where it moves in contact with a chelating resin for removing the final traces of heavy metals. The sodium chloride brine 24 is collected from the column 23. This brine is substantially saturated with sodium chloride and it is contaminated by potassium chloride, sodium sulphate and sodium carbonate. It comprises, for example, per kg of dry matter, from 700 to 750 g of sodium chloride, from 10 to 50 g of potassium chloride, approximately 100 g of sodium sulphate and approximately 100 g of sodium carbonate.

In accordance with the invention, the brine 24 is introduced into a reaction chamber 25 where it is treated with an aqueous hydrochloric acid solution 47 in an amount sufficient to decompose the sodium carbonate and to form sodium chloride. The brine 28 collected from the reaction chamber 25 is subjected to flushing with a stream of air 30 in a column 29 to discharge the carbon dioxide 49 generated by the decomposition of the sodium carbonate. In a reaction chamber 31 situated downstream of the column 30, calcium chloride 32 is added to the degassed brine 48 exiting from the column 29 to precipitate a portion of the sulphate ions in the form of glauberite (double calcium and sodium sulphate). The calcium chloride 32 is, however, employed in an amount insufficient to react with all the sulphate ions in the brine 48. The aqueous suspension 33 collected from the chamber 31 is treated on a filter 34 where the glauberite precipitate 35 and an aqueous solution 36 are separated, the glauberite precipitate being discharged. The aqueous solution is conveyed to an evaporator-crystallizer 37 where it is subjected to partial evaporation.

The pressure, the temperature and the degree of evaporation in the evaporator-crystallizer 37 are chosen to crystallize sodium chloride while expressly avoiding the crystallization of; other compounds, in particular potassium chloride and sodium sulphate. The evaporation can, for example, be carried out at a temperature of 80 to 120° C. A slurry of crystals 38 is withdrawn from the crystallizer 37, from which slurry sodium chloride crystals 40 of high purity are collected on a filter 39, which crystals are exploited as is, for example in an industrial process.

The aqueous mother liquor 41 from the crystallizer 37 comprises potassium chloride and sodium sulphate and it cannot be discharged as is to the environment. It is treated in the crystallizer 42 where it is cooled to a sufficiently low temperature (for example to the ambient temperature of 20 to 25° C.) to crystallize glaserite (double potassium and sodium sulphate). A slurry of crystals 43 is withdrawn from the crystallizer 42, which slurry is subjected to filtration 44. The crystals 45 separated from the slurry are discharged, for example in a public landfill site, and the aqueous mother liquor 46 is recycled to the reaction chamber 31.

In an alternative form of the process according to the invention, it may prove desirable to dilute the aqueous mother liquor 41 with additional water (not represented) to prevent sodium chloride from crystallizing in the crystallizer 42.

In the operation of the process which has just been described, the amount of calcium chloride 32 introduced into the crystallization chamber 31 is calculated according to the respective contents of sodium sulphate and of potassium chloride in the brine 48, so that all the potassium is precipitated in the form of glaserite in the crystallizer 42 and so that the balance of sulphate ions is precipitated in the form of glauberite in the reaction chamber 31.

Figure 2:
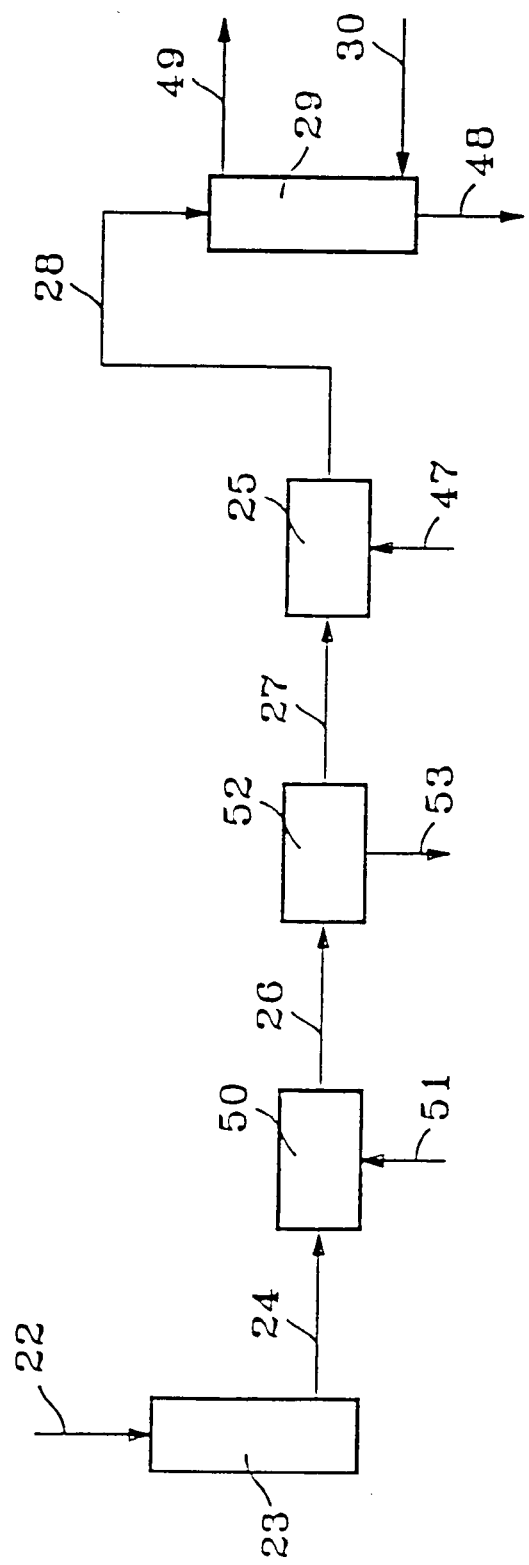
FIG. 2 shows a detail of an alternative form of the embodiment of FIG. 1.

In the alternative implementation represented schematically in FIG. 2, the brine 24 (contaminated by potassium chloride, sulphate ions and sodium carbonate) is treated in a reaction chamber 50 with a sufficient amount of carbon dioxide 51 to decompose the sodium carbonate and to crystallize sodium bicarbonate. An aqueous suspension 26 is collected and is treated on a filter 52 to separate the sodium bicarbonate crystals 53. The brine 27 collected from the filter 52 is subsequently treated as stated above, with reference to FIG. 1, first in the reaction chamber 25 with hydrochloric acid 47, to free it from the final traces of sodium carbonate, and then in the degassing column 29, to remove the $CO_2$ generated in the chamber 25. This alternative implementation of the process according to the invention exhibits the advantage of recovering sodium bicarbonate, which it is possible to exploit in the reaction chamber 7 (FIG. 1) in purifying the flue gas 6.

What is claimed is:

1. Process for the production of sodium chloride crystals from a sodium chloride brine contaminated by potassium chloride and sulphate ions, according to which, in a first stage, a calcium compound is added to the brine to precipitate calcium sulphate, which isolated, and an aqueous solution is collected, in a second stage, the aqueous solution from the first stage is subjected to evaporation, to crystallize sodium chloride, and sodium chloride crystals and an aqueous mother liquor are collected separately, and, in a third stage, the aqueous mother liquor from the second stage is subjected to cooling in order to crystallize at least a portion of the potassium chloride, wherein the amount of calcium compound in the first stage and the cooling in the third stage are adjusted so that the sulphate ions precipitate in the form of glauberite in the first stage and of glaserite in the third stage.

2. Process according to claim 1, wherein said calcium compound comprises calcium chloride.

3. Process according to claim 1, wherein said evaporation is carried out at a temperature of 80 to 120° C. and the cooling is carried out at a temperature of 10 to 70° C.

4. Process according to claim 1, wherein before the second stage, sodium carbonate is added to the aqueous solution collected from the first stage to precipitate the residual calcium ions in the form of calcium carbonate.

5. Process according to claim 1, wherein if the brine is contaminated by sodium carbonate, it is treated, before the first stage, with hydrochloric acid in order to decompose the said sodium carbonate.

6. Process according to claim 1, wherein the brine comprises, per kg of dry matter, from 550 to 800 g of sodium chloride, from 50 to 350 g of sodium sulphate and from 5 to 100 g of potassium chloride.

7. Process according to claim 6, wherein the brine comprises, per kg of dry matter, from 50 to 250 g of sodium carbonate.

8. Process according to claim 1, comprising the use, in the aqueous mother liquor, of an amount of water sufficient to prevent sodium chloride from crystallizing in the third stage.

9. Process according to claim 1 wherein the brine employed in the first stage is obtained from a gas contaminated with hydrogen chloride by adding a basic sodium compound to form a dust comprising sodium chloride, sodium sulfate, potassium chloride and dispersing said dust in water or an aqueous medium.

10. Process according to claim 9, wherein said basic compound comprises sodium bicarbonate and in that the brine comprises sodium carbonate and is treated, before the first stage, with carbon dioxide in order to crystallize sodium bicarbonate, which is collected and recycled in the basic compound.

* * * * *